(Model.)
2 Sheets—Sheet 1.
H. L. RUSSELL.
Indicator Lock.
No. 232,069.   Patented Sept. 7, 1880.
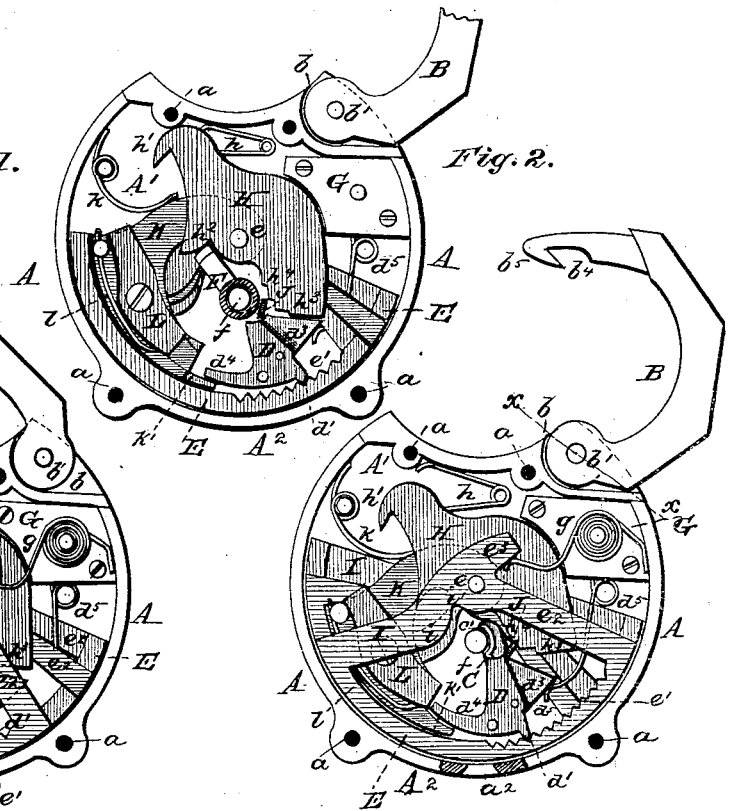
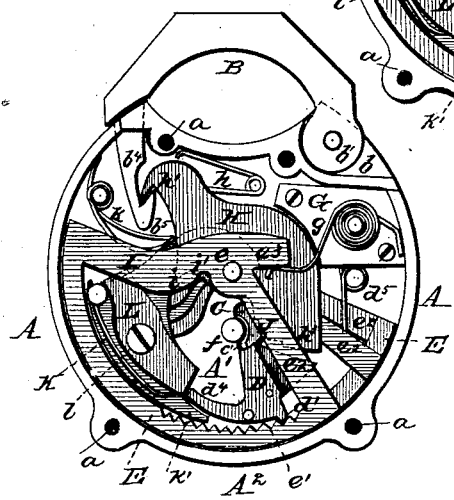
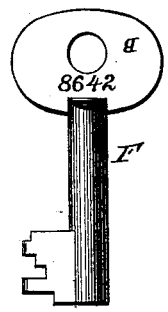
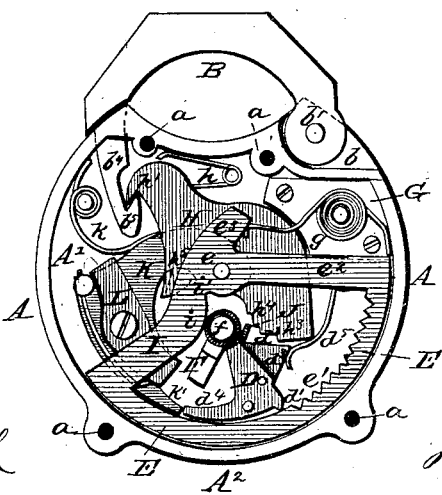
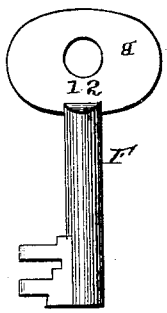
Witnesses:
Fred G. Dieterich
P. C. Dieterich
Inventor:
Henry L. Russell
per DeWitt C. Allen
atty (Model.)  2 Sheets—Sheet 2.
H. L. RUSSELL.
Indicator Lock.
No. 232,069. Patented Sept. 7, 1880.
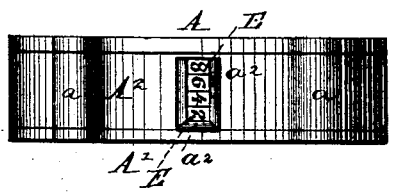
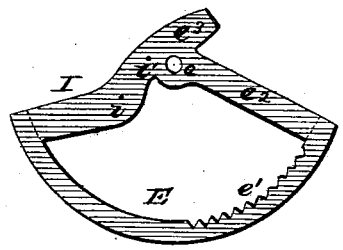
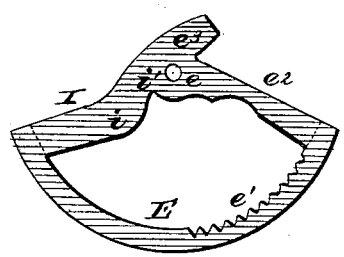
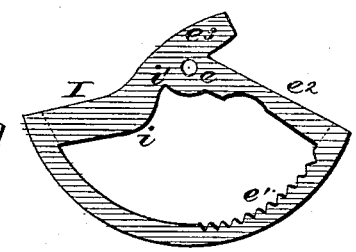
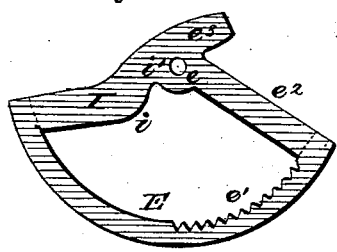
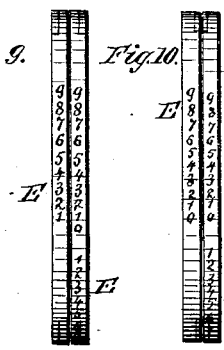
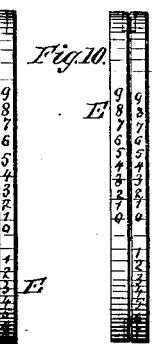
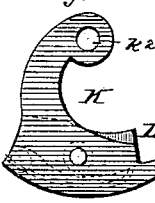
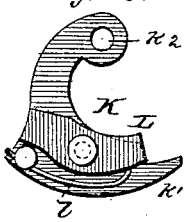
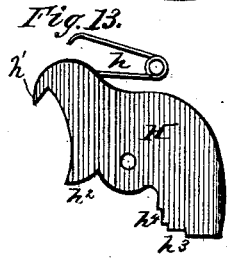
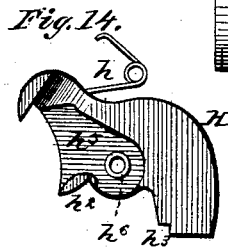
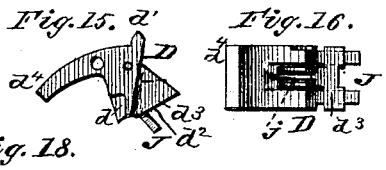
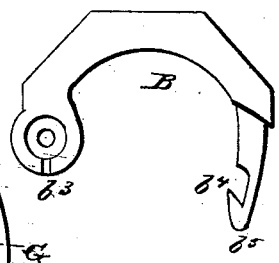
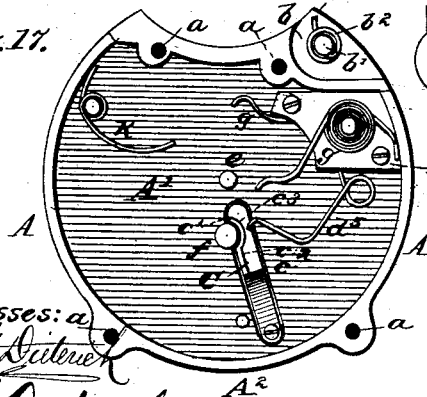
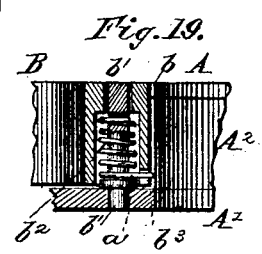
Witnesses:
Fred G. Dieterich
P. C. Dieterich
Inventor:
Henry L. Russell
by DeWitt C. Allen
atty.

UNITED STATES PATENT OFFICE.

HENRY L. RUSSELL, OF BLOOMINGTON, ILLINOIS, ASSIGNOR TO RUSSELL INDICATOR LOCK COMPANY, OF SAME PLACE.

INDICATOR-LOCK.

SPECIFICATION forming part of Letters Patent No. 232,069, dated September 7, 1880.

Application filed May 19, 1880. (Model.)

*To all whom it may concern:*

Be it known that I, HENRY LEWIS RUSSELL, a citizen of the United States, residing at Bloomington, in the county of McLean and State of Illinois, have invented certain new and useful Improvements in Indicator-Padlocks, (Case B;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in the class of padlocks employing a pivoted shackle; and the object of my invention is to construct such class of locks upon the same principle as the lock for which Letters Patent numbered 223,955 were granted to me January 27, 1880, with registering and locking mechanism adapted to be operated by differently formed and numbered keys, that shall indicate or register the number of the key that unlocks it.

My invention also has for its object to render more secure and generally improve such class of locks.

My improvements consist in certain novel combinations of devices and in novel constructions of parts, which will hereinafter specifically be designated.

In the accompanying drawings, Figure 1 is a plan or face view with one section of the lock-case removed to show the works and interior construction, with the parts in the locked positions; Fig. 2, a similar view with the parts in the unlocked positions and the shackle opened; Fig. 2$^A$, a similar view with the parts in the unlocked positions before removing the key; Fig. 3, a similar view with the parts in the locked positions and a key locked therein after a partial revolution; Fig. 4, a bottom-end view of the lock; Figs. 5, 6, 7, and 8, side views of the registering-tablets, and Figs. 9 and 10, front views of the same; Figs. 11 and 12, detail views of the tumblers for locking the registering-tablets through the medium of a dog or detent; Figs. 13 and 14, detail views of the locking dogs or detents for engaging with the nose of the shackle; Figs. 15 and 16, detail views of the locking-dog that engages with the registering-tablets; Fig. 17, a front or face view with one section of the lock-case and most of the working parts removed to show the springs and a spring-tumbler connected to the inside of the remaining section of the lock-case; Fig. 18, detached side view of the shackle; Fig. 19, a section through the line $x\,x$ of Fig. 2. Figs. 20 and 21 represent keys No. 8642 and 12 for operating the lock.

To enable others skilled in the art to make and use my invention, I will now proceed to describe its construction and operation.

In the drawings, A represents the lock case or shell, made in sections and united by a number of suitably-located rivets, $a$.

In the upper edge and on the outside of the case or shell of the padlock is a socket, $b$, in which is a transverse pin, $b'$, upon and around which is securely fixed a coiled or spiral spring, $b^2$, provided with a slightly protruding point, $a'$. Over this spring $b^2$, and between the upward-extending plates of the case or shell A, is fitted the socketed end of the shackle B, the point $a'$ of the spring $b^2$ entering the slot $b^3$ in the socketed end of said shackle, so that as the shackle is unlocked the tension of the spring $b^2$ throws it open.

By this arrangement of an outside socket for the reception of the pivoted end of the shackle, rain and dampness are excluded from the interior of the case or shell, excepting at the key-hole, which may, however, be covered with a guard.

On the inside of the back plate, A$'$, of the case or shell is a socket, $c$, for the reception of the flat spring-tumbler C, having one end secured to said plate A$'$ almost directly beneath the key-hole, and this spring-tumbler is provided with a straight and curved upwardly-projecting flange, $c'$, all as clearly shown in Fig 17. The straight portion $c^2$ of said flange $c'$ engages a slot or recess, $d$, (see Fig. 15,) in the bottom or lower side of the pivoted dog or detent D, for the purpose of securing or holding it into engagement with the teeth or serrations of the registering-tablets when the key is withdrawn from the lock. The curved portion $c^3$ of said flange $c'$ partially encircles the key-stud $f$, so that when the key is inserted in the lock it will force the tumbler C down, and thus throw it out of engagement with the dog or detent D.

The registering arrangement in the present instance is composed of four like quadrantal tablets, E, pivoted or journaled one above the other on the central stud, $e$, and the curved faces of these tablets fit against the lower inside face of the rim $A^2$ of the case or shell A, so that as said tablets are moved by a key, F, the numbers or other indicating-characters on their curved faces will be shown or seen through the aperture $a^2$ in the bottom of said rim $A^2$, as clearly represented in Fig. 4. The inner or concave edges of these tablets E are provided with teeth or serrations $e'$, with which the tooth $d'$ of the pivoted dog or detent D engages for securing the tablets in any position they may be moved by a key in unlocking the lock.

The radial arms $e^2$ of the registering-tablets E are held against the abutment G when in their normal position, so that each tablet presents a blank portion of its curved face at the aperture $a^2$, through the medium of springs $g$, extending from said abutment G and engaging with the projecting ends $e^3$ of said tablets, as clearly shown in Fig. 3.

The radial arms I of the registering-tablets are provided with inner curved shoulders, $i$, (the curve of each shoulder differing slightly in its radius, for a purpose to be hereinafter described,) against which the keys of the lock engage for operating or moving said tablets, as shown in detail at Figs. 5, 6, 7, and 8. These arms I are also provided with notches or recesses $i'$ just beyond the curved shoulders $i$, into which the key enters after moving the registering-tablets E, to indicate or register the number of the key being used, and is thus prevented from being turned any farther in that direction, as will be hereinafter more fully explained.

H H represent two irregularly-shaped dogs or detents, also pivoted on the stud $e$, and actuated by attached springs $h\ h$, having their free ends bearing against the upper and inner face of the rim $A^2$. Each of said dogs or detents H is provided at its upper end with a hook or lug, $h'$, to engage a suitable notch or shoulder, $b^4$, on the shackle-nose $b^5$, for securing the shackle B in a locked or closed position. These dogs or detents H H, in connection with other operating parts of the lock, constitute very important features of my invention. They are provided at $h^2$ with curved notches, and against the forward slope of said notches the key in its partial revolution engages for throwing said dogs or detents out of engagement with the shackle-nose, for unlocking the shackle B, while the key, then coming in contact with the rear slope of said notches $h^2$, is prevented from turning farther in that direction.

The rear and lower ends, $h^3$, of the dogs or detents H H are brought in contact with the upper edge, $d^2$, of the V-shaped projection $d^3$ of the pivoted dog or detent D, as clearly shown in Fig. $2^A$, after the key has moved the registering-tablets to indicate or register its number, and commences to move said dogs or detents H H for unlocking the shackle, thus holding said dogs or detents H H out of engagement with the shackle-nose, and also throwing said dog or detent D into engagement with the registering-tablets until the key is turned backward and removed, when the locking parts will assume the unlocked positions shown in Fig. 2.

The dog or detent D is provided with a supplemental dog or detent, J, actuated by a spring, $j$, for engaging with the inner and lower notched ends, $h^4$, after dogs or detents H H, for holding said locking dogs or detents H H into engagement with the shackle-nose.

K K represent two pivoted tumblers actuated by springs $k\ k$, and having curved and tapering portions $k'\ k'$ playing against the inner or concave faces of the registering-tablets E, and which pass between the projecting portion $d^4$ of the dog or detent D and the inner faces of the registering-tablets, for also securing or holding said dog or detent D into engagement with the registering-tablets, as clearly shown in Figs. 1 and 2.

The tumblers K K are provided with pivoted dogs or detents L L, actuated by springs $l\ l$, and with which the key engages in its forward revolution, for throwing said tumblers K K out from between the dog or detent D and registering-tablets, thus permitting said dog or detent D to be thrown out of engagement with the registering-tablets through the medium of its actuating-spring $d^5$, and permitting them to resume their normal position, as shown in Fig. 3, and in which position the key is prevented from being turned backward without first being turned forward to unlock the lock, which will then register its number. The inner faces of the dogs or detents L permit the key to be turned back without interfering or disturbing the position of the tumblers K.

The registering-tablets E, tumblers K K, and dogs or detents H H are arranged in the case or shell in the following manner: One of the registering-tablets E is first mounted on the stud $e$. Next upon said stud is placed one of the dogs or detents H, and over this is placed one of the tumblers K. Next upon the stud are placed two of the registering-tablets E, and next above these are placed duplicates of the dog or detent H and tumbler K, with their faces, however, reversed to the lower ones, and in both cases the tumbler K fitting in the recessed face $h^5$ of the dog or detent H, with its eye $k^2$ over a boss, $h^6$, about the eye of said dog or detent, and finally the fourth registering-tablet E is mounted on the stud $e$.

The object of this arrangement of the registering-tablet, dogs or detents H H, and tumblers K K, is to equalize or distribute the strain upon the ward or wards of the keys used for operating the locks.

In the present instance two keys are shown for operating my improved lock, one of which is made to register or indicate its number, 8642, when used for unlocking the lock, as shown in Figs. 4 and 20, and the other key its number, 12, as shown in Fig. 21.

This lock will register all numbers from 1 to 9999, and for each number in this range there is provided a separate key, whose application to this lock will invariably register a certain combination of numbers, and none other, and each key will have stamped upon it the number of the combination it will register.

It is obvious that, instead of using numbers or figures for registering, letters or any other indicating-characters might be substituted therefor.

It is obvious that one of the pivoted dogs or detents H, and also one of the pivoted tumblers K, with its pivoted dog or detent L, might be dispensed with, in which case the remaining dog or detent H and tumbler K, with its dog or detent L, should be centrally arranged on the stud $e$, with two of the registering-tablets below and two above them. Also, in case a limited number of keys is desired to be used, the upper and lower registering-tablets might be dispensed with.

The object of having the curved shoulders $i$ of the arms I of the registering-tablets of different radius is for the purpose of more securely preventing the changing of the keys by outside parties to operate the lock.

The operation of my improved lock is as follows: All the parts being in their locked positions, as shown in Fig. 1, a key is introduced into the lock and pushed down upon the spring-tumbler C, which throws and holds its flange or stud $c^2$ out of engagement with the dog or detent D. The key, being then turned to the right, comes in contact with the dogs or detents L L, throwing the tumblers K K out from between the dog or detent D and registering-tablets, which permits said dog or detent D to be thrown forward out of engagement with said registering-tablets through the medium of its actuating-spring $d^5$, while the registering-tablets, through the medium of their actuating-springs $g$, will be caused to resume their normal position, as clearly shown in Fig. 3, with their radial arms $e^2$ resting against the abutment G, so that each tumbler E presents a blank portion of its curved face at the aperture $a^2$ in the rim $A^2$ of the shell or case of the lock. In this position of the moving parts of the lock the key is prevented from being turned backward to be withdrawn by the dog or detent D. Consequently, it has to be turned farther forward, and in so doing the key engages the curved shoulders $i$ of the arms I of the registering-tablets, and moves them so as to indicate or register the number of the key being used at the aperture $a^2$. The key then comes in contact with the forward slope of the notches $h^2$ of the dogs or detents H H, which moves them so as to throw their hooked ends $h'$ out of engagement with the shackle-nose, thus releasing the shackle B and permitting it to be thrown open through the medium of the spring $b^2$, as shown in Fig. 2.

During the above-described operation of moving the dogs or detents H H their lower ends, $h^3$, come in contact with the edge $d^2$ of the dog or detent D, throwing and securing it into engagement with the registering-tablets, and holding the dogs or detents H H in their unlocked position, as shown in Fig. 2, A, the key being prevented from turning farther forward by its engagement with the notches $i'$ and $h^2$ in the arms of the registering-tablets and dogs or detents H H. The key can now be turned backward and withdrawn from the lock; but in so doing the pivoted dogs or detents H H will assume the position shown in Fig. 2, through the medium of their actuating-springs $h$, in which position they are secured by the supplemental dog or detent J of the dog or detent D engaging with the inner and lower notched ends, $h^4$, of said dogs or detents H H, thus preventing their being forced backward either when the shackle is opened or closed, except by the insertion of a key adapted to operate them. It will thus be observed that a key must be inserted and turned in order to lock or unlock the shackle B, and in so doing it must always operate the registering mechanism, and thereby indicate or register its number at the aperture $a^2$ through the rim $A^2$ of the case or shell.

Having thus fully described my invention, I do not wish to be understood as claiming, broadly, in this case locking and registering mechanism adapted to be operated by differently formed and numbered keys, whereby the number of the key used for operating the lock will be indicated or registered, as that is shown in my former patent, before referred to.

Only such features as are common in this and another patent of mine, bearing even date, relating to indicator-padlocks are claimed, broadly, in this case.

Having thus fully described my invention, what I claim as new, and desire to secure by Letters Patent, is—

1. In an indicator-padlock, the combination, with a shackle, of one or more locking-tumblers and one or more registering-tablets arranged substantially as described, both said tumblers and tablets being directly operated by any one of a series of differently formed and indicated keys for registering or indicating the particular key used in unlocking the lock, substantially as specified.

2. In an indicator-padlock, the combination, with a shackle, of locking and registering mechanism adapted to be operated by differently formed and indicated keys, means, substantially as described, to prevent the key from being turned entirely around in the lock, and mechanism for preventing the key from being removed therefrom after a partial revolution without first registering its number and unlocking the lock, substantially as specified.

3. In an indicator-padlock, the combination of a series of registering-tablets and one or more intermediate locking-tumblers, both said tumblers and tablets being directly operated by differently formed and indicated keys, and a pivoted dog or detent for securing said tablets in any position into which they may be moved by a key in unlocking the lock, substantially as specified.

4. In an indicator-padlock, the combination of a series of movable registering-tablets for registering any one of a series of differently formed and indicated keys, a series of operating-springs, and an abutment, G, whereby said tablets are adapted to be thrown or returned to their normal position previous to being moved by a key for registering its number in unlocking the lock, substantially as specified.

5. In an indicator-padlock, the combination, with a shackle, of a series of registering-tablets, pivoted locking dog or dogs H, pivoted tumbler or tumblers K, and a pivoted dog, D, substantially as and for the purpose herein shown and described.

6. In an indicator-lock, the combination, with a shackle, of a series of registering-tablets, locking dog or dogs H, and pivoted dog D, having a supplemental dog, J, adapted to engage with said dog or dogs H, substantially as and for the purpose herein shown and described.

7. In an indicator-padlock, the combination of one or more locking-tumblers, a series of registering-tablets, a pivoted dog or detent, D, adapted to engage with said tumbler or tumblers and tablets, and a spring-tumbler, C, for holding said dog or detent in engagement with said tablets and thrown out of engagement with said dog or detent by a key for operating the lock, substantially in the manner herein shown and described.

8. In an indicator-padlock, the combination, with the registering-tablets, of the pivoted dog or detent D, having projecting portion $d^4$, and the pivoted tumbler or tumblers K, having curved and tapering faces $k'$, adapted to pass between said dog or detent D and registering-tablets, for holding or securing said dog or detent D into engagement with said registering-tablets, substantially in the manner herein shown and described.

9. In an indicator-padlock, the combination, with the registering-tablets, of the pivoted dog or detent D, and tumbler or tumblers K, provided with a pivoted dog or detent, L, substantially as and for the purpose herein shown and described.

10. In an indicator-padlock, the combination of the registering-tablets having arms I, provided with curved shoulders $i$, having different radius, substantially as and for the purpose herein shown and described.

11. In an indicator-padlock, the combination of the registering-tablets having arms I, provided with notches $i'$, and the pivoted locking dog or dogs H, having a notch or notches, $h^2$, substantially as and for the purpose herein shown and described.

12. In an indicator-padlock, the combination of the registering-tablets having notches or serrations $e'$ on their inner concave faces, pivoted dog or dogs H, having notches $h^2$, pivoted tumbler or tumblers K, having pivoted dog or dogs L, pivoted dog D, and spring-tumbler C, substantially as and for the purpose herein shown and described.

In testimony whereof I affix my signature in presence of two witnesses.

HENRY LEWIS RUSSELL.

Witnesses:
DeWITT C. ALLEN,
ALBERT H. KRAUSE.